United States Patent
Miller (10) Patent No.: US 7,052,280 B2
(45) Date of Patent: May 30, 2006

(54) SURGICAL TRAINING APPARATUS AND METHOD

(75) Inventor: Eric C. Miller, Fairfield, CT (US)

(73) Assignee: United States Surgical Corporation, Norwalk, CT (US)

( * ) Notice: Subject to any disclaimer, the term of this patent is extended or adjusted under 35 U.S.C. 154(b) by 0 days.

(21) Appl. No.: 10/146,774

(22) Filed: May 16, 2002

(65) Prior Publication Data

US 2003/0027119 A1 Feb. 6, 2003

Related U.S. Application Data (63) Continuation of application No. 09/156,906, filed on Sep. 18, 1998, now abandoned.

(51) Int. Cl.
*G09B 23/28* (2006.01)

(52) U.S. Cl. .................................................... 434/262

(58) Field of Classification Search ............... 434/262, 434/267, 218, 188, 191, 209; 273/142 F; 206/315.11; 250/253, 256, 269.3
See application file for complete search history.

(56) References Cited

U.S. PATENT DOCUMENTS

| | | | |
|---|---|---|---|
| 2,721,082 A | 10/1955 | Honold | |
| 3,237,949 A | 3/1966 | Chamberlin | |
| 3,348,319 A | 10/1967 | Harrison | |
| 3,663,017 A | 5/1972 | Lopez | |
| 3,741,565 A | 6/1973 | Breitling | |
| 3,793,758 A * | 2/1974 | Feldhusen et al. | 40/530 |
| 4,014,109 A | 3/1977 | Schramm | |
| 4,126,789 A | 11/1978 | Vogl | |
| 4,280,047 A | 7/1981 | Enos | |
| 4,493,653 A | 1/1985 | Robbins | |
| 4,497,486 A | 2/1985 | Bennett | |
| 4,545,578 A | 10/1985 | Stagg | |
| 4,571,107 A | 2/1986 | Takada | |
| 4,782,640 A | 11/1988 | Scheiwiller | |
| 4,822,048 A | 4/1989 | Axup | |
| 4,884,810 A | 12/1989 | Tiyony | |
| 4,889,991 A | 12/1989 | Ramsey et al. | |
| 4,959,547 A | 9/1990 | Carroll et al. | |
| 5,055,051 A | 10/1991 | Duncan | |
| 5,061,187 A | 10/1991 | Jerath | |
| 5,102,167 A | 4/1992 | Groswith | |
| 5,205,429 A | 4/1993 | Woolworth | |
| 5,273,435 A | 12/1993 | Jacobson | |
| 5,376,803 A | 12/1994 | McFee | |
| 5,472,238 A | 12/1995 | Sato | |
| 5,524,634 A * | 6/1996 | Turkel et al. | 600/562 |
| 5,637,364 A | 6/1997 | Akao | |
| 5,755,057 A | 5/1998 | Dancer | |

(Continued)

OTHER PUBLICATIONS

CIS-US, Inc., "Nuclear Medicine Q. C. and Calibrated Source Catalog", Rev. 1096.

(Continued)

*Primary Examiner*—Kurt Fernstrom (57) ABSTRACT

A surgical training apparatus and method are provided simulating a patient having background radiation emissions level and at least one concentrated source of radiation emissions. The apparatus includes a plurality of notches in a lower base portion for receiving test sources, and a cover for overlaying the lower base during the training procedures. Identification indicia is provided within each of the notches and on the cover to correlate the notch position with the closed cover surface. A radiation detection device is used to scan the surfaces in training surgeons for radiation identification and localization techniques.

10 Claims, 11 Drawing Sheets

U.S. PATENT DOCUMENTS

| | | | |
|---|---|---|---|
| 5,799,787 A | | 9/1998 | Talbot |
| 5,866,907 A | | 2/1999 | Drukier |
| 5,941,569 A | * | 8/1999 | Solomons .................. 281/21.1 |
| 5,957,501 A | | 9/1999 | Van Ardenne |
| 5,988,366 A | * | 11/1999 | Krull et al. .................... 206/8 |

OTHER PUBLICATIONS

Isotopes Products Laboratories, "Anodized, Electroplated, Deposited, Polysurface TM Disc and Planar Standards", 0795.

* cited by examiner

SURGICAL TRAINING APPARATUS AND METHOD

CROSS REFERENCE TO RELATED APPLICATIONS

This application is a continuation application of U.S. application Ser. No. 09/156,906, filed Sep. 18, 1998 now abandoned, the entire contents of which is hereby incorporated by reference.

BACKGROUND

1. Field

This disclosure relates generally to a surgical training and demonstration apparatus. More particularly, it relates to an apparatus and method for demonstrating and training surgeons in the techniques of intraoperative gamma detection and localization in biological systems.

2. Background of the Related Art

The detection of cancerous tissue using emissions from radionucleid labeled antibodies has been the subject of intense investigation for many years. Typically, the procedures involve the injection of radionucleid labeled antibodies into a patient. Over time, e.g. four to twenty-four hours, these labeled antibodies concentrate at tumor sites where they can be detected using sophisticated radiation detection equipment.

The particular choice of radionucleid for labeling antibodies is dependent on its nuclear properties, the physical half life, the detection instrument capabilities, the pharmacokinetics of the radiolabeled antibody and the degree of difficulty of the labeling procedure. Early techniques utilized the $^{131}$I radionucleid in conjunction with a relatively large and complex gamma camera positioned above the patient during the imaging process. This technique was less than ideal because the high energy gamma-photon emitted from $^{131}$I is not well detected by traditional gamma cameras. In addition, the administered marker emissions deliver a high radiation dose to the patient. These techniques are also deficient in that, as tumor sites become smaller, the radionucleid concentrations tend to become lost, from an imaging standpoint, in the background or blood pool radiation necessarily present in the patient.

In an effort to overcome these limitations, extensive research has been carried out in the field using much lower energy gamma emissions levels, for example, $^{125}$I (27–35 kev), in conjunction with probe-type detection structure configured for insertion into the patient's body to minimize attenuation.

This improved method of localization, differentiation and removal of cancerous tumors involves a surgical procedure wherein the patient suspected of having neoplastic tissue is administered an effective amount of a labeled antibody specific for neoplastic tissue. The antibody is labeled with a radioactive isotope exhibiting photo emissions of specific energy levels. These radioactive nuclides are well known to those skilled in the art and include Cl-36, Co-57, Co-60, Sr-90, Tc-99, Cs-137, Tl-204, Th-230, Pu-238, Pu-239, Am-241, Cr-51, Sr-85, Y-88, Cd-109, Ba-133, Bi-210, Ge-68, Ru-106, Iodine-125, Iodine-123, and Indium-III as well as other Alpha and/or Beta emitters.

The surgical procedure is then delayed for a time interval to permit the labeled antibody to concentrate in the neoplastic tissue and to be cleared from normal tissue so as to increase the ratio of photon emissions from the neoplastic tissue to the background photon emissions. Once this time interval passes, the patient is surgically accessed and tissue within the operative field to be examined for neoplastic tissue is measured for a background photon emission count. Thereafter, a hand held probe is manually manipulated within the operative field adjacent tissue suspected of being neoplastic.

Another common procedure which makes use of radionucleid labeled antibodies is known as Lymphatic Mapping and is used in the diagnosis and treatment of e.g. skin or breast cancers. This procedure permits the surgeon to map the drainage of cancerous lesions to determine the extent and location of their expansion in the body. Radionucleid labeled antibodies are injected at the site of the known lesion and permitted to circulate with the drainage of the lesion to the lymph nodes. Thereafter, using a radiation detector, the specific lymph nodes affected by the lesion can be identified and selectively treated.

In carrying out the RIGS and lymphatic mapping procedures, the encountered radiation may be quite random and the background-to-concentration ratios may vary widely. To be used to its maximum effectiveness these procedures should be carried out by a highly trained surgeon experienced in the nuances of cancerous tissue detection. To date, surgeons have been trained using textbooks, observation and animal studies. While these are adequate to familiarize the surgeons with ideal or typical background-to-concentration readings, they are inadequate to simulate actual physiological patient conditions and, in the case of animal laboratory studies are quite expensive. Further, in animal studies neoplastic tissue is typically not inherently present, making simulation of background radiation and areas of concentration difficult at best.

Accordingly, a need exists for a surgical training/demonstration structure which can be used in training surgeons in in vivo radiation detection without the need for animal laboratory studies.

SUMMARY

The present disclosure shows a surgical training apparatus for training surgeons in the identification and localization of photon emissions from radioisotopes. The training apparatus includes a lower base portion having a plurality of notches therein. A cover is adapted to overlay the lower base portion and cover the plurality of notches. Identification indicia is included within each of the plurality of notches and on the cover. The cover identification indicia corresponds directly to the underlying notch when the training apparatus is in the closed position. At least one test source is disposed within one of the plurality of notches and is adapted to simulate a photo emission of a radioactive isotope. A probe device is used by the surgeon in conjunction with the training apparatus to familiarize the surgeon with the operation of the probe, and the principles and techniques associated with intraoperative gamma detection.

A three-dimensional surgical training apparatus has several overlying layers each having a plurality of notches therein. Identification indicia can be included on the uppermost cover layer, and in each of the plurality of notches. The cover layer identification indicia corresponds directly to the underlying notch of each layer. At least one test source is disposed within one of the plurality of notches and is adapted to simulate a photo emission of a radioactive isotope. A probe device is used by the surgeon in conjunction with the three-dimensional training apparatus to familiarize the surgeon with the operation of the probe, and the principles and techniques associated with intraoperative gamma detection.

BRIEF DESCRIPTION OF THE DRAWINGS

Various embodiments of the subject surgical training apparatus are described herein with reference to the drawings wherein.

DETAILED DESCRIPTION OF THE PREFERRED EMBODIMENTS

Figure 1A:
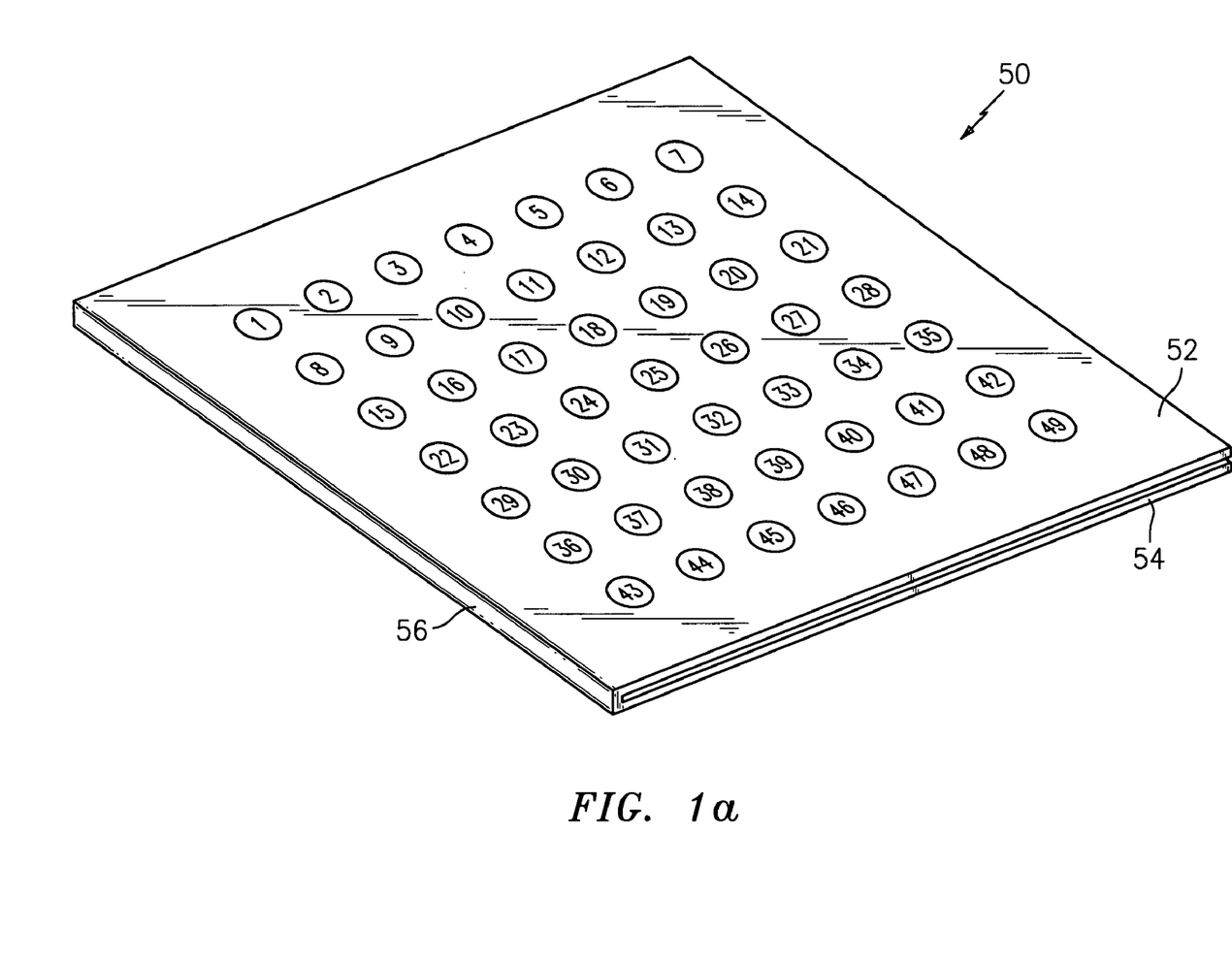
FIG. 1a is a closed perspective view of the training apparatus.
Figure 1B:
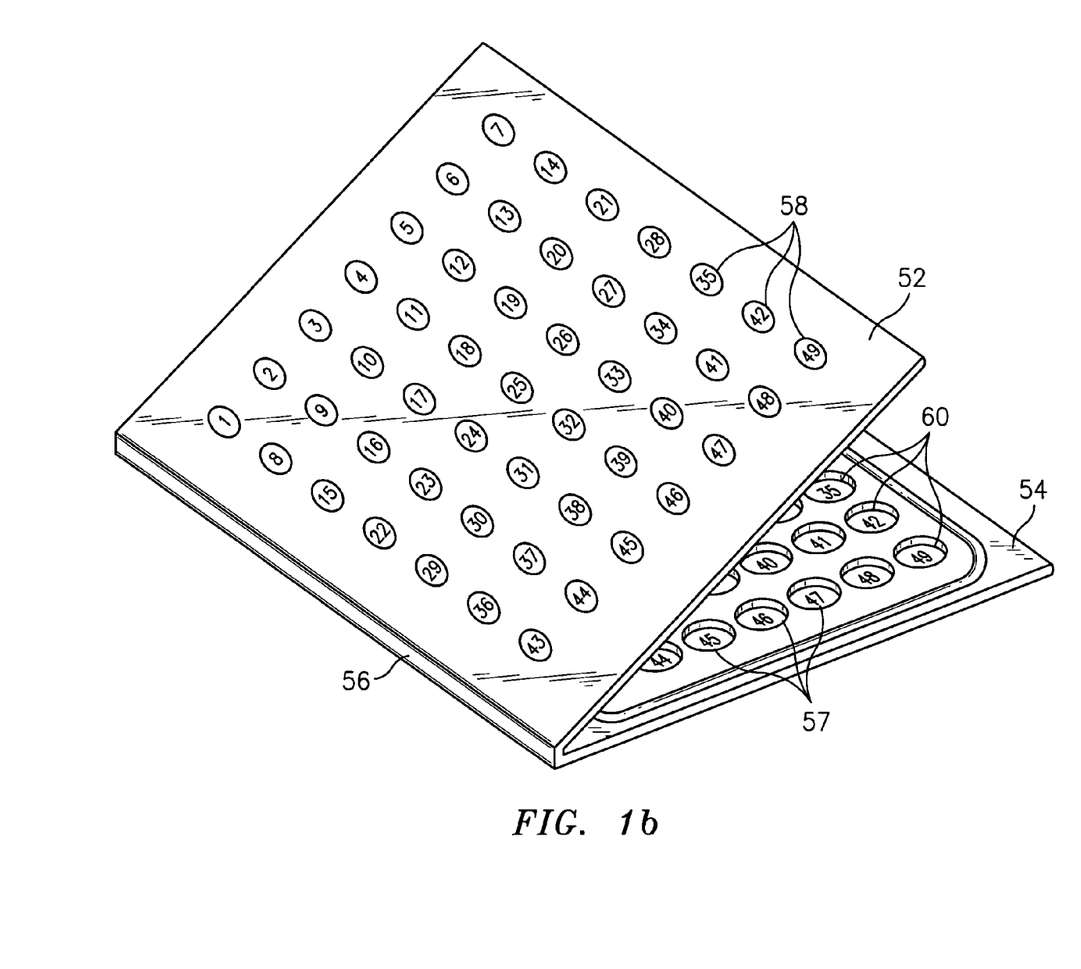
FIG. 1b is an open perspective view of the training apparatus.

Referring to FIGS. 1a and 1b, the training apparatus 50 has booklet configuration with an upper cover 52 and a lower base 54. Cover 52 is hingedly connected to lower base 54 along a lateral edge 56. Inside training apparatus 50, lower base 54 includes a plurality of receiving notches 60 arranged in a grid-like spaced configuration. Notches 60 have a depth and a number designation 57 for identifying each notch location. Cover 52 also includes a plurality of number designations 58 which are also arranged in a grid-like configuration such that the number designations 58 correspond to the oppositely opposed number designation 57 when cover 52 and base 54 are disposed in the closed position as depicted in FIG. 1a. Notches 60 can be any suitable shape and are shown as circular for purposes of illustration. Number designations 57 and 58 provide an identification system for assisting in the training of a surgeon in the use of the probe device 64.

The number designations 58 of cover 52 are shown in consecutive order starting at "1" and ending at "49". The actual number in the space can be changed provided the notches in base 54 have the same number corresponding to the number designation on cover 52 when device 50 is in the closed position. Other identification indicia could be used, for example, letters, symbols, etc. without departing from the scope of this disclosure.

Figure 2A:
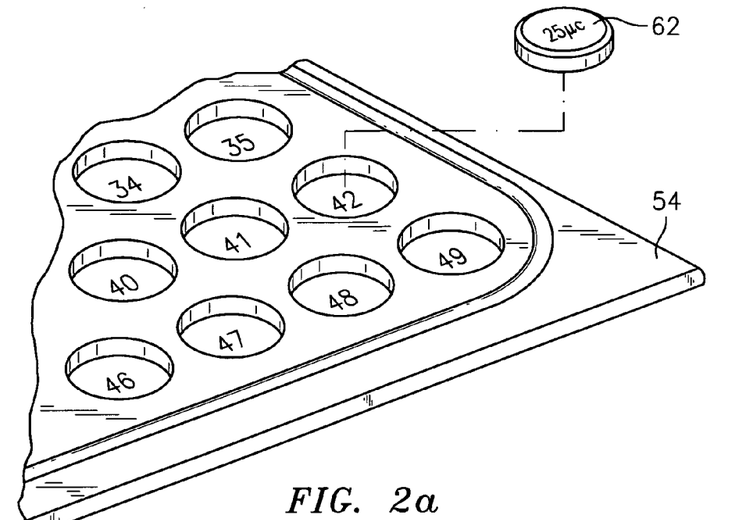
FIG. 2a is a perspective view of a check source used in the training apparatus.
Figure 2B:
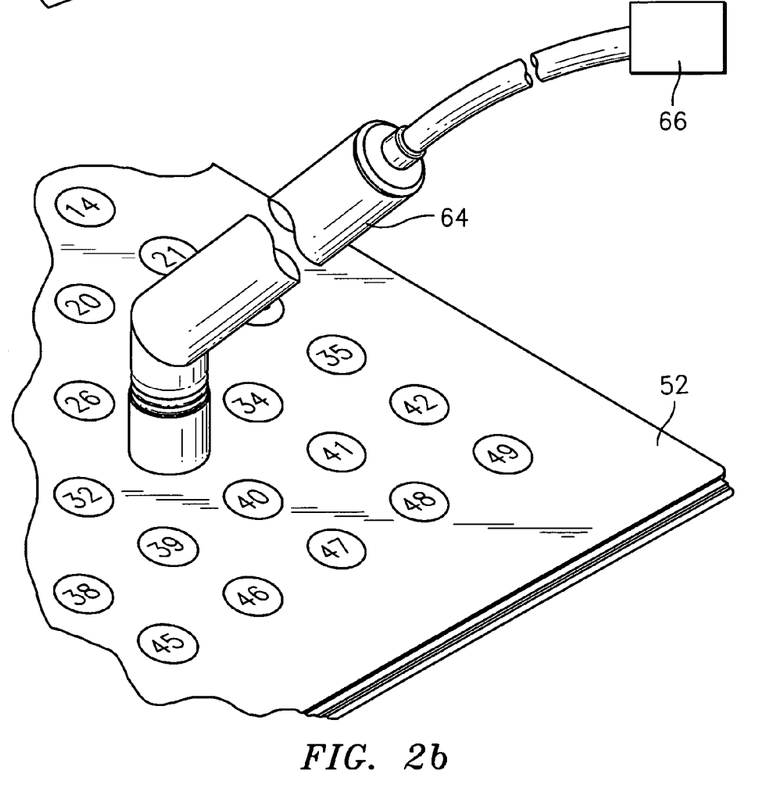
FIG. 2b is a partial perspective view of the training apparatus with a detection probe positioned for detection of concentrations of radiation.

FIG. 2a shows a test source 62 that is to be disposed in the notch designated "42". Test source 62 has a gamma radiation (emission) value that can be varied according to the training being performed. For example, and for purposes of illustration, test source 62 has a 25 µc rating. After test source 62 has been inserted into the desired notch, cover 52 is closed over base 54, and a probe-type detecting device 64 is placed over the training device 50 and is used by the surgeon to detect the previously positioned test source. This device 64 is preferably configured for insertion into a patient's body and is capable of detecting low levels of radiation. U.S. Pat. No. 4,801,803 to Denon et al. and U.S. Pat. No. 4,889,991 to Ramsey et al., both incorporated herein by reference, disclose a probe instrument and related control circuitry having the requisite sensitivity for use with relatively low energy radionuleids.

When using the device 64 in conjunction with training apparatus 50, the surgeon first calibrates the detector's control circuitry 66 to a radiation detection level and then moves the device over the apparatus while discerning increases in the radiation levels. These increases can then be localized until the source is pinpointed. By selecting appropriate nucleids, the detection process for tumor localization can be accurately and easily simulated.

Figure 3A:
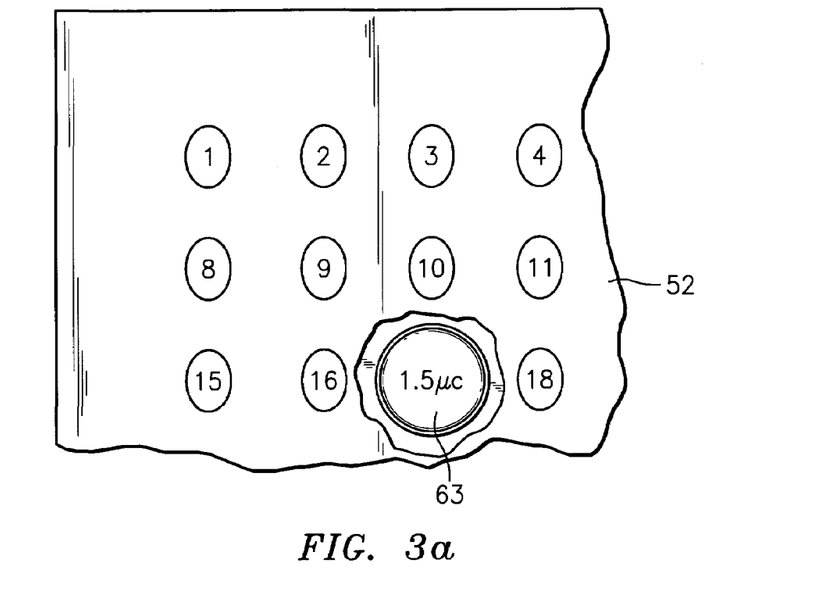
FIG. 3a is a broken away plan view of the training apparatus with a first check source positioned therein.
Figure 3B:
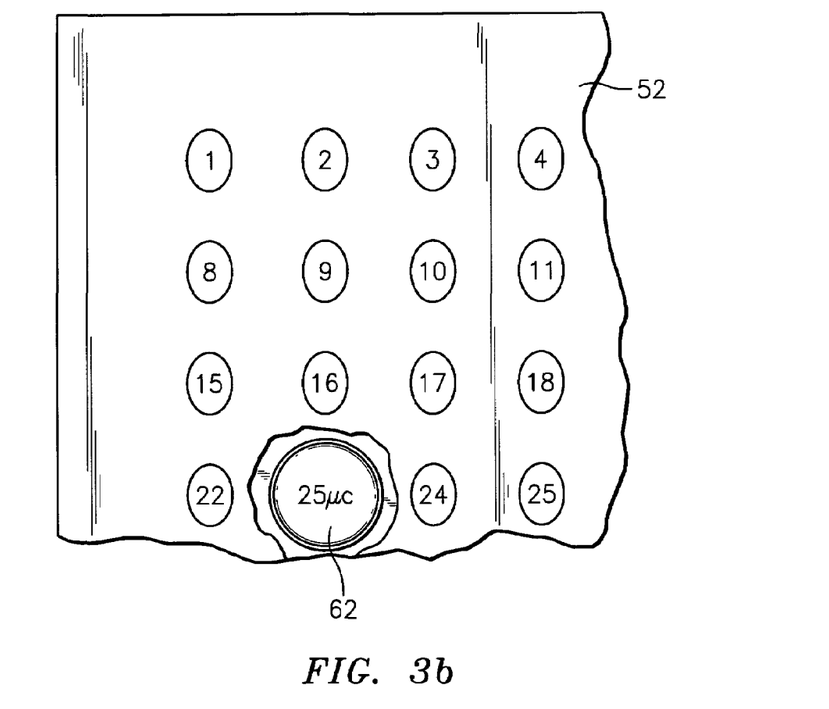
FIG. 3b is a broken away plan view of the training apparatus with a second check source positioned therein.

FIGS. 3a and 3b show examples of the positioning of two different test sources 62 and 63 within the training apparatus 50. Test source 63 is positioned within the notch designated "17" and source 62 is positioned in notch designated "23". The test sources are positioned within training device 50 without the knowledge of the surgeon being trained or tested.

Figure 4A:
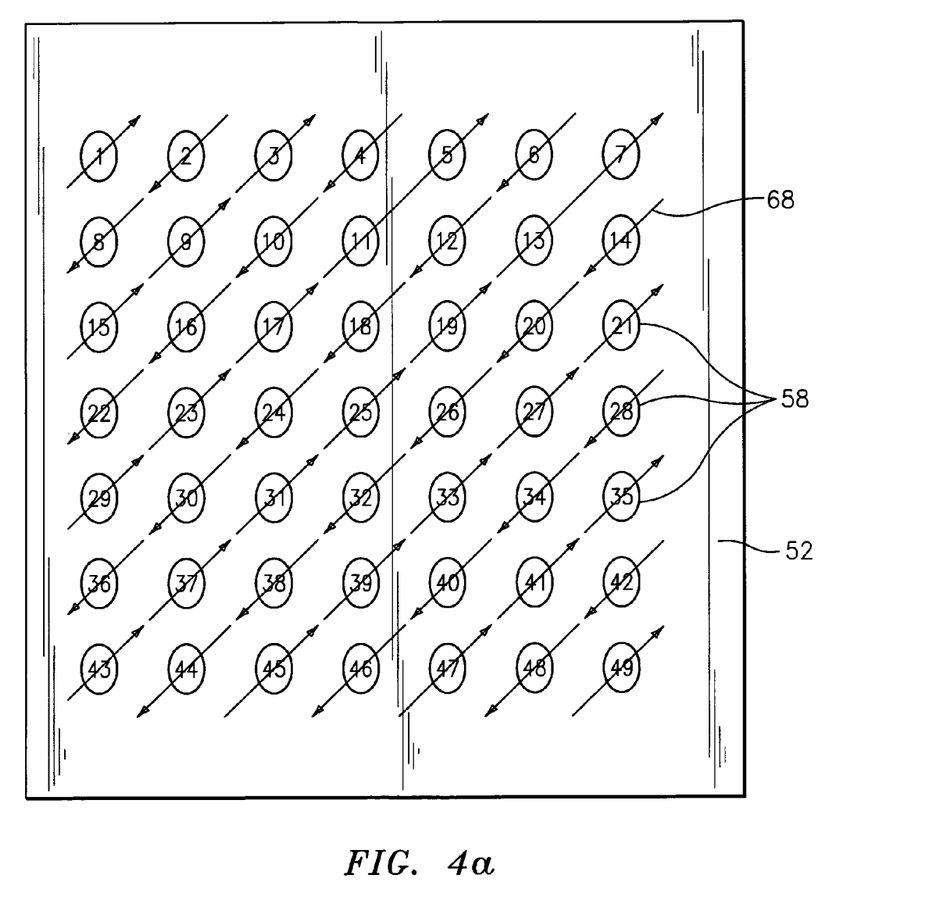
FIG. 4a is a schematic representation of a first scanning method used in the training apparatus.
Figure 4B:
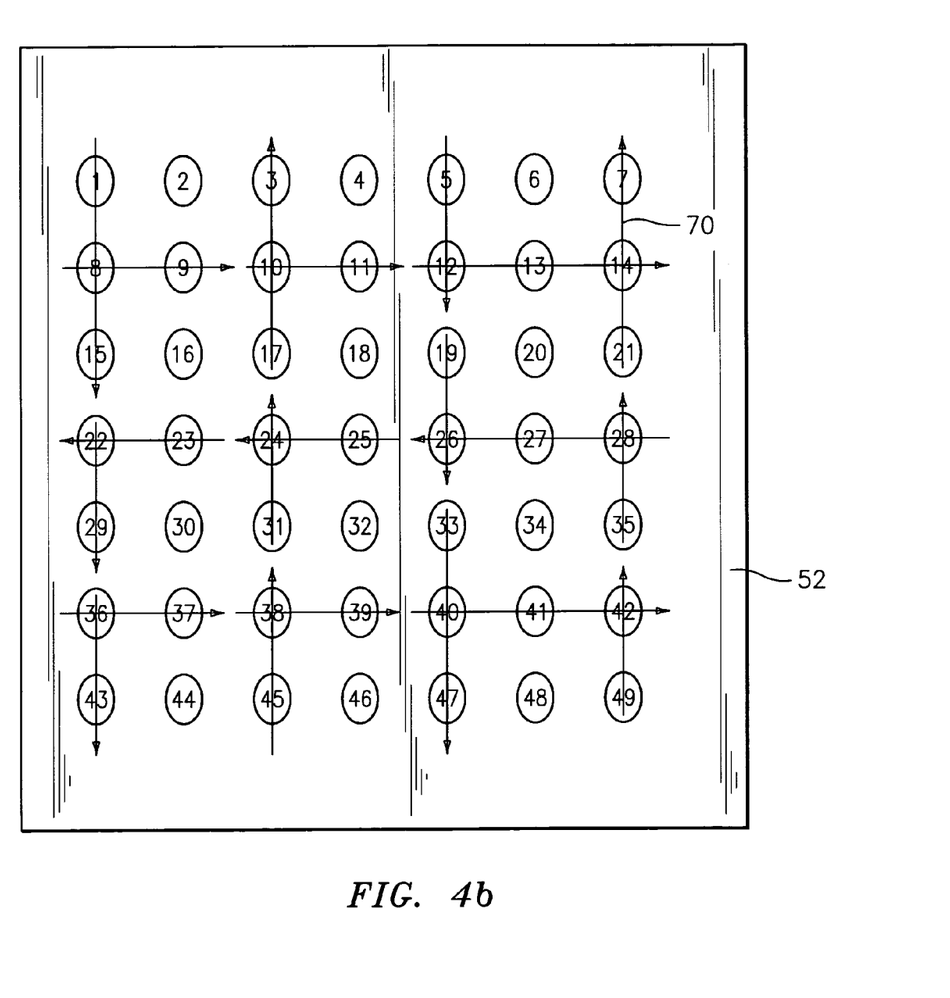
FIG. 4b is a schematic representation of a second scanning method used in the training apparatus.

FIG. 4a shows a scanning technique 68 which is implemented during the use of training device 50. As shown, scanning technique 68 is a diagonal technique where the passing of device 60 over the number designations 58 is performed in opposing diagonal directions for each adjacent diagonal row. FIG. 4b shows an alternative scanning technique 70 which is performed in a grid-like manner. The grid-like scanning technique 70 scans every other row or column of number designations 58. This grid scanning technique can also be performed for every row and column, without departing from the scope of this disclosure.

Once a test source has been positioned (FIGS. 3a and 3b), the surgeon utilizes a scanning technique (FIGS. 4a and 4b) to identify the "hot" node. Once the surgeon has identified a sufficient change in the probe device 64 reading, and believes to have identified the hot node, device 16 is to moved slightly away from the "hot" node in each direction to demonstrate confirmation of the node's location. The location of the test source is to be changed several times to assure the surgeon's ability to localize and identify the hot node.

Figure 5A:
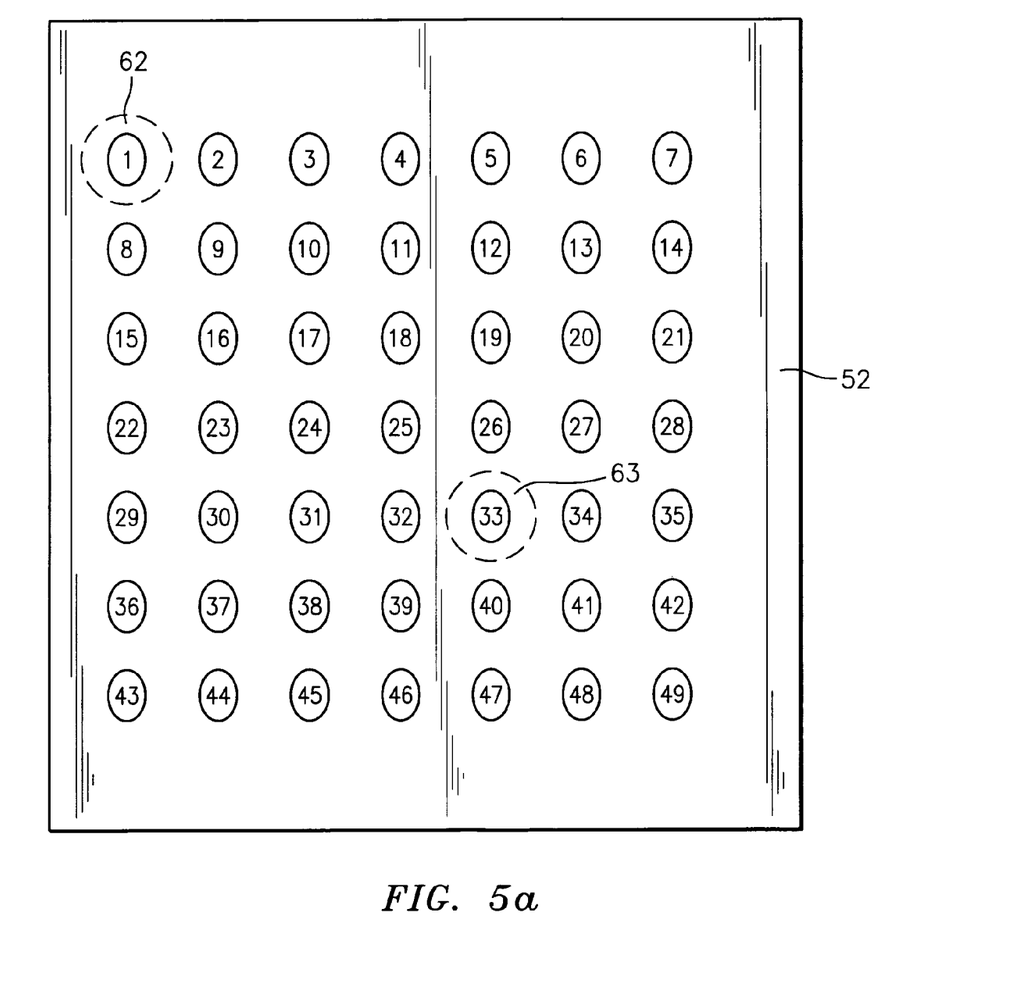
FIG. 5a is a plan view of the training apparatus with two check sources shown in phantom positioned therein.
Figure 5B:
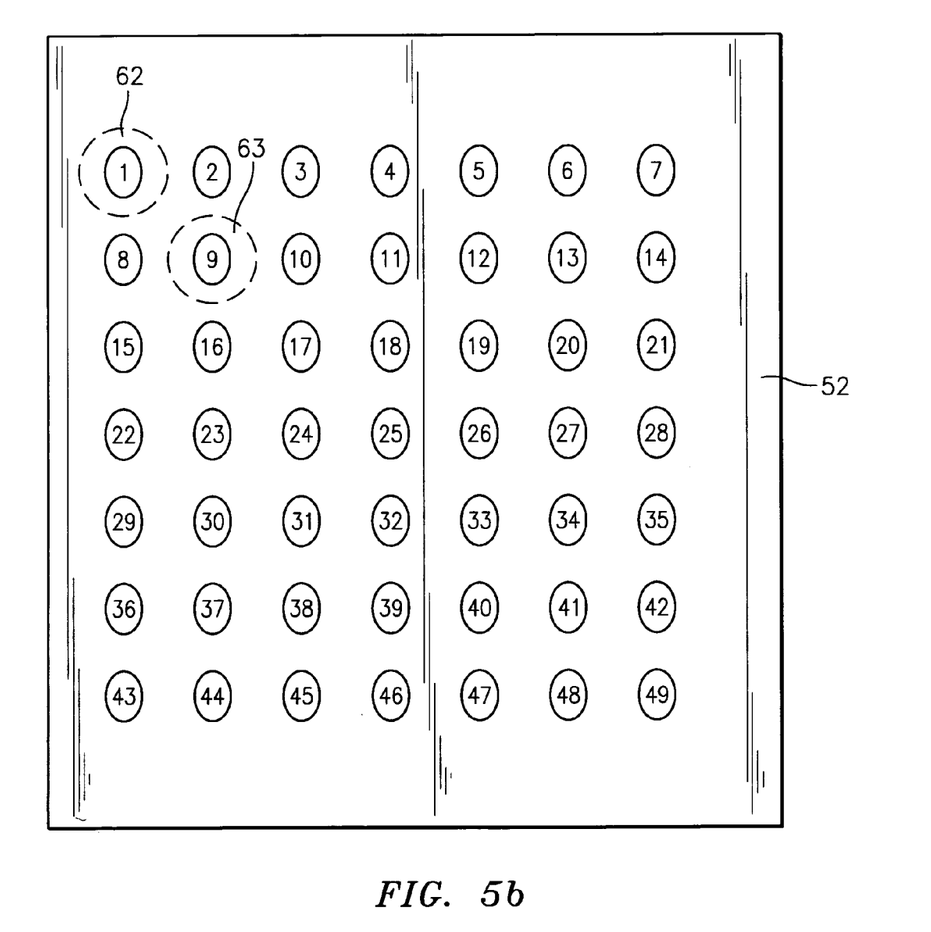
FIG. 5b is a plan view of the training apparatus with two check sources shown in phantom positioned differently therein.

FIGS. 5a and 5b illustrate training procedures for a clinical application of the probe device. The 25 µc source 62 is introduced as the injection site, and the 1.5 µc source 63 is introduced as the sentinel node. In practice, the counts for these sources are equivalent to actual clinical cases.

Referring to FIG. 5a, the injection site source 62 is placed within notch 1 of base 54, and the sentinel node source 63 is placed within notch 33 of base 54, and the upper cover 52 is closed. The surgeon is then instructed to confirm the injection site by implementing a diagonal scanning technique (FIG. 4a). During the scanning procedure, it is important to emphasize the angling of the probe device away from the injection site. The diagonal scanning will provide higher count readings as the probe approaches the sources. The surgeon will notice the highest count reading at the injection site (source 62) with a drop off as the probe is moved from the injection site. The surgeon will also notice a count increase reading on the probe device as they approach the sentinel node (source 63).

Figure 6A:
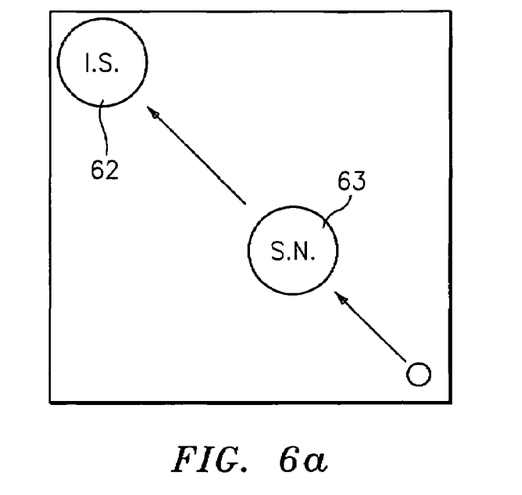
FIG. 6a is a graphical representation of a scanning detection method used with the training apparatus.
Figure 6B:
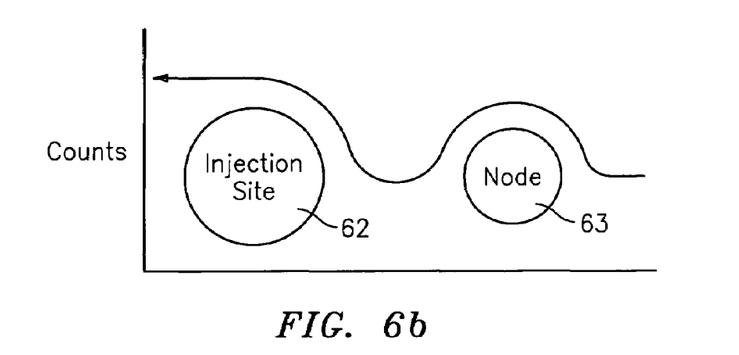
FIG. 6b is a graphical representation of a scanning confirmation method.

FIGS. 6a and 6b demonstrate the procedure for performing a "rollercoaster" confirmation of the localization of the respective sources. Using the placement of sources 62 and 63 of FIG. 5a as an example, the probe device is to be positioned at the point farthest away from an identified injection site (i.e., number designation 49). The surgeon will notice a low count reading on the probe device as this point. As shown in FIG. 6b, as the probe device approaches the node source at number designation 33, the count reading will rise, and then fall as the node is passed. As the probe device approaches the injection site source (i.e., at number designation 1), the count readings increase dramatically. The graphical representation of FIG. 6b shows the "rollercoaster" confirmation as it is based on the count readings produced by the probe device while scanning across the surface of training device 50.

The location of test sources 62 and 63 are changed for each training session, and can be positioned in any one of the spaces provided in training device 50 without departing from the scope of this disclosure.

FIG. 5b shows another training procedure utilizing the disclosed training device 64. During these diagnoses, a shine-through effect can deteriorate the accuracy at which the localization of the injection site and sentinel node. The shine through is defined where approximately 90% of the radio-colloid remains at the injection site and only 10% localizes in the effected nodal basin. For example, as shown in FIG. 5b, the 1.5 μc source 63 has been positioned in notch 9 immediately adjacent 25 μc source 62 in notch designated 1. In this instance, since the injection site (i.e., number designation 1) is closed to the effected nodal basin (i.e., designation number 9), it may be difficult to distinguish those counts coming from the sentinel node versus counts coming from the injection site.

Figure 7:
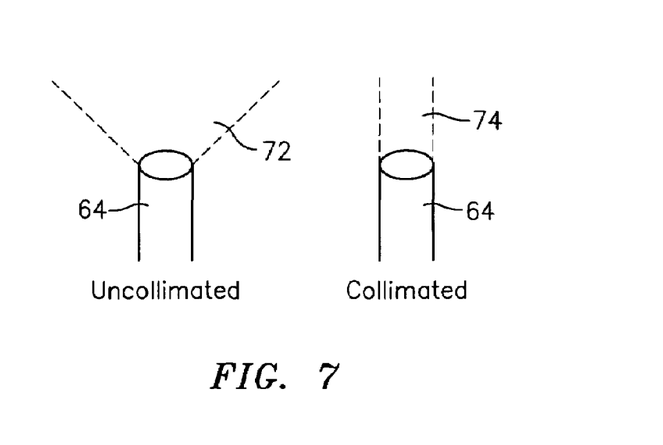
FIG. 7 illustrates two modes of operation for the probe device utilized by the disclosed training apparatus.

In order to minimize shine-through, the primary lesion is excised prior to localization. For purposes of the training device 50, the surgeon will, as before, continue to point/angle the probe device away from the injection site. In addition, a collimation feature of the probe device is utilized. FIG. 7 illustrates the use of the collimation feature of probe device 64. In the uncollimated mode, the detection beam 72 is angularly dispersed from the end of device 64. With the collimated mode, however, the dispersal of the detection beam is narrowed, and nearly eliminated, providing a more focused detection beam 74. In the training example of FIG. 5b, the uncollimated mode of probe device 64 will prevent the localization of the node due to the shine-through effect. By using the collimated detection beam, the surgeons ability to localize the node adjacent the injection site is significantly increased.

As mentioned previously, the position of the test sources 62 and 63 are varied several times to familiarize the surgeon with all aspects of localization techniques.

Figure 8:
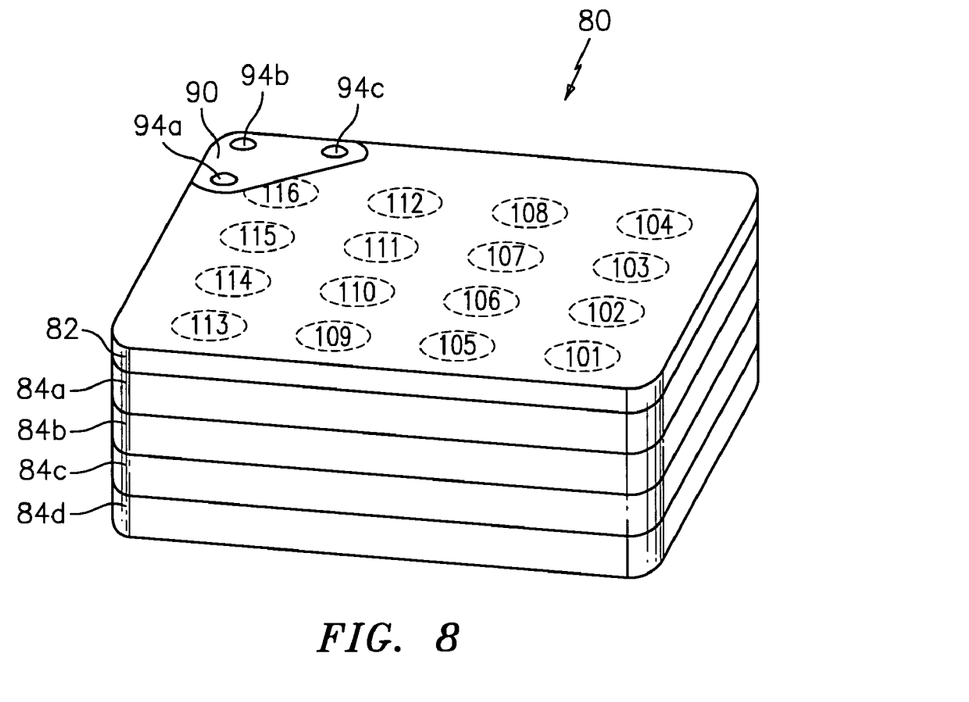
FIG. 8 is a closed perspective view of the three-dimensional training apparatus.

FIG. 8 shows a three-dimensional training device 80 having a cover layer 82 and overlapping underlying layers 84a–84d. The cover 82 and layers 84a–84d are connected together using bolts 94a–94c and screw nuts 98a–98c, respectively. Bolts 94a–94c pass through an upper plate 90, cover 80, layers 84a–84d and a lower plate 92 (FIG. 9) where they are secured using screw nuts 98a–98c, respectively. Bolts 94a–94c and the corresponding screw nuts 98a–98c are a representative method of securing the layers of training apparatus 80. Any other suitable known method or device may also be used for maintaining cover 82 and layers 84a–84d in an substantially overlying configuration.

Figure 9:
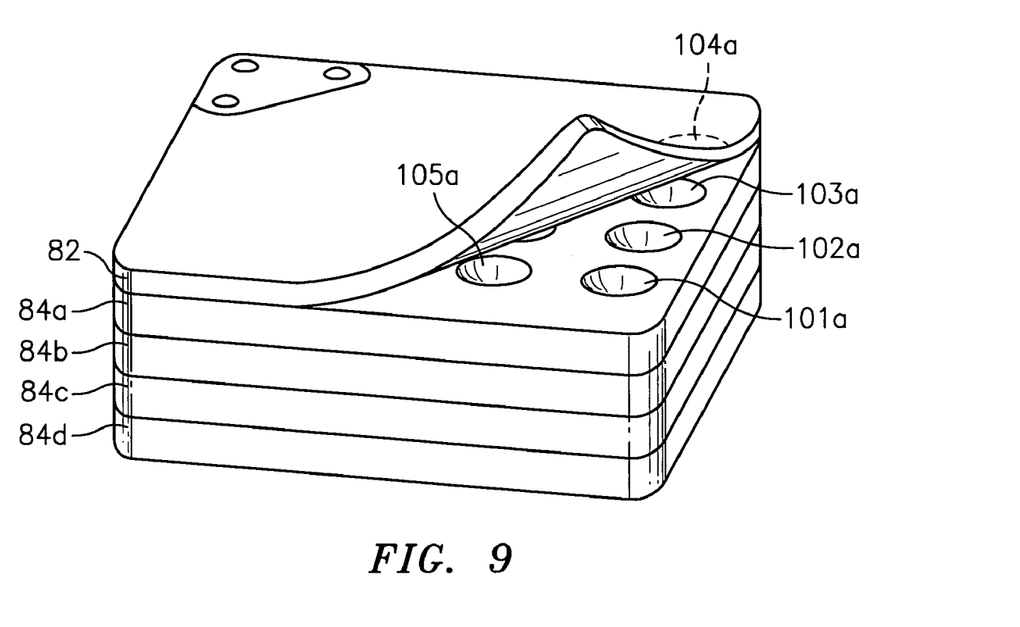
FIG. 9 is a partially open perspective view of the three-dimensional training apparatus.
Figure 10:
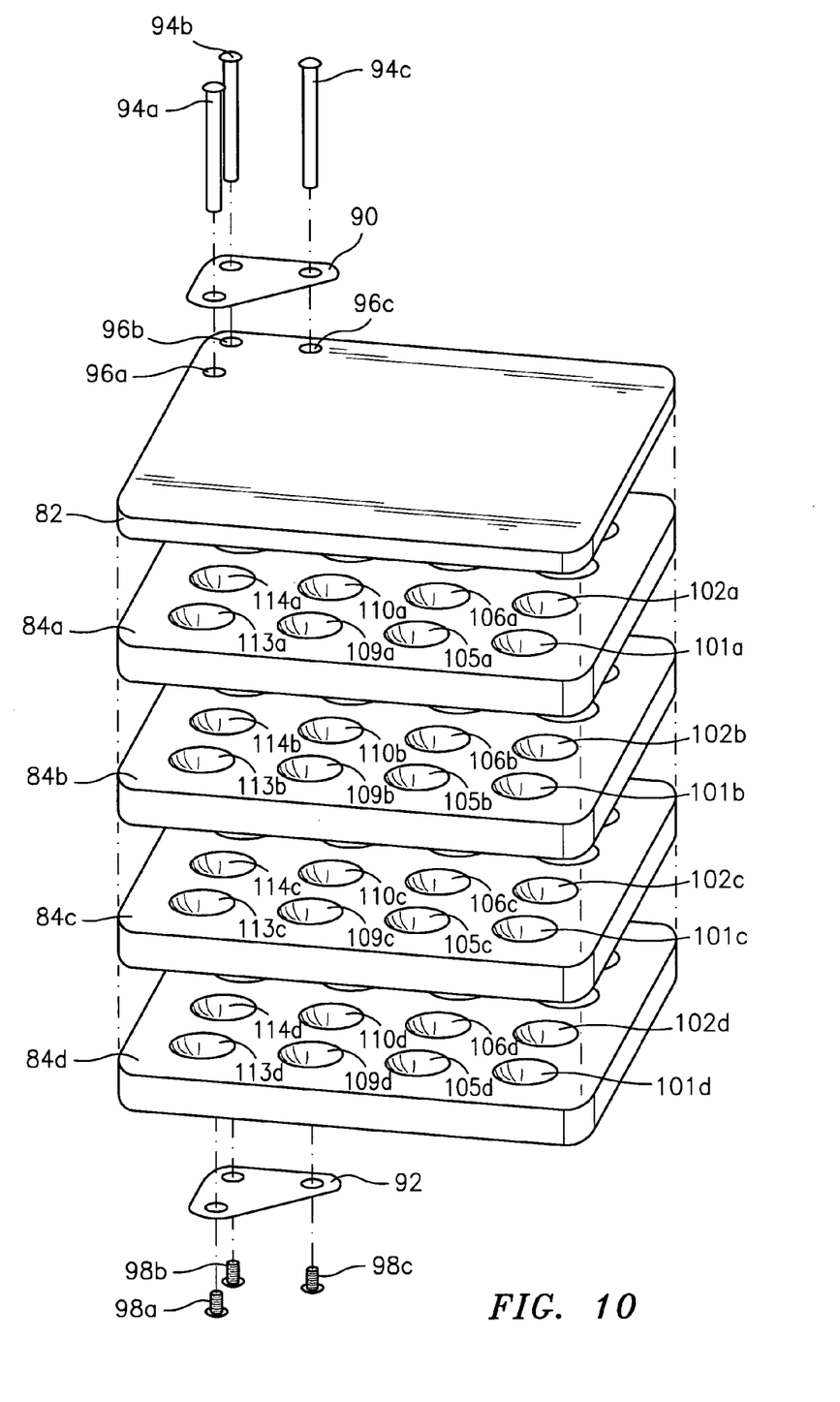
FIG. 10 is an exploded perspective view of the three-dimensional training apparatus.

Each layer 84a, 84b, 84c, and 84d includes a plurality of notches 101a–116a, 101b–116b, 101c–116c, and 101d–116d, respectively (FIGS. 8–10). Cover 82 has identification indicia 101–116 corresponding to the locations of the underlying notches, respectively. As described with reference to the training apparatus 50, test sources 62 and 63 can be disposed in any one of the notches in any one of the layers 84a–84d. The test source is positioned in a notch without the knowledge of the surgeon being trained or tested. The Surgeon then uses probe 64 to detect the location of the test source. The scanning motion or patterns of probe 64 shown in FIGS. 4a and 4b can be performed in three dimensions across the top of cover 82, the sides of layers 84a–84d, and along the bottom of lower layer 84d. Thus, providing a more realistic simulation of tumor localization.

It will be understood that various modifications may be made to the embodiments shown herein. For example, the first training device illustrated above need not be planar but can be fabricated in any desired shape or configuration. Also, the radionucleids can be selected from any group appropriate to training and/or demonstration. Therefore, the above description should not be construed as limiting, but merely as exemplifications as preferred embodiments. Those skilled in the art will envision other modifications within the scope and spirit of the claims appended hereto.

I claim:

1. A surgical training apparatus for training surgeons in the use of a probe and at least one emitting test source for the identification and localization of emissions from the at least one emitting test source, the surgical training apparatus comprising:

an upper planar cover, a lower planar base hingedly connected to the upper cover, the cover and the base having a closed position and an open position;

a plurality of receiving notches included in the base, wherein each notch of the plurality of notches is configured to receive an emitting test source inserted therein; and identification indicia included within each of the plurality of notches and on the cover, the cover identification indicia corresponding directly to the underlying notch, the identification indicia include a number designation for identifying the location of each notch, the cover being in the closed position when used with a probe and at least one emitting test source for training surgeons to identify and localize the at least one emitting test source inserted therein.

2. The surgical training apparatus of claim 1, wherein the cover and base are planar and the plurality of notches on the base form a grid pattern.

3. The system of claim 1, wherein the cover and the at least one gamma radiation source are proximal to each other when the cover and the base are in the closed position.

4. A surgical training apparatus for concealing at least one emitting test source for subsequent detection by a separate detector comprising:

a lower base having a planar surface defining a plurality of notches disposed therein;

at least one emitting test source, wherein each notch is configured for disposing the at least one emitting test source therein for surgical training; and a planar cover hingedly attached to the base for selectively covering the at least one emitting test source in said lower base and identification means disposed on said cover and in each notch, the identification means in each notch including a number designation for correlating the position of said notches with respect to said cover when said cover overlays said lower base, said cover formed of a material conductive to radiation for detection and localization using a separate detector.

5. A surgical training apparatus for training surgeons in the use of a probe and at least one emitting test source for the identification and localization of emissions from the at least one emitting test source, the surgical training apparatus comprising:

a plurality of planar layers including a planar cover layer and overlapping underlying planar layers, the cover layer and overlapping layers being connected together in a substantially overlying configuration wherein each of the layers is substantially identical in length and in width, at least one layer being configured as a flexible layer;

a plurality of notches positioned on each of the underlying layers, wherein each notch of the plurality of notches is configured to receive an emitting test source inserted therein;

identification indicia positioned on the cover and in the plurality of notches positioned on each underlying layer, the identification indicia on the cover and each underlying layer corresponding to the location of each underlying layer and the location of each notch positioned on each underlying layer; and an open position and a closed position, wherein the plurality of layers being in the closed position when used with a probe and at least one emitting test source for training surgeons to identify and localize the at least one emitting test source inserted in at least one of the plurality of notches positioned on the underlying layers.

6. The surgical training apparatus of claim 5, wherein the plurality of notches positioned on each overlying layer form a three dimensional grid pattern.

7. A system for training a surgeon to identify a location of at least one concealed gamma radiation source, the system comprising:

a hand-held probe having a detection beam for detecting gamma radiation; and an apparatus for storing and concealing the at least one gamma radiation source, the apparatus having an open position and a closed position, the apparatus including:

a cover having identification indicia disposed thereon in a grid configuration, each position in the grid configuration having a numeral selected from the indicia and associated therewith;

a base hingedly attached to the cover and having a plurality of notches disposed in the grid configuration therein, each notch in the plurality of notches corresponding to a position in the grid configuration and having a numeral selected from the identification indicia wherein corresponding numerals on the cover and the base indicate the same position in the grid configuration when the apparatus is in the closed position and each notch in the plurality of notches is configured to receive the at least one gamma radiation source, wherein the at least one gamma radiation source is not visible to the surgeon when the apparatus is in the closed position.

8. The system of claim 7, wherein the cover and the base are substantially planar structures.

9. The system of claim 8, wherein the cover and the at least one gamma radiation source are proximal to each other when the apparatus is in the closed position.

10. The system of claim 7, wherein the detection beam is selectable between a collimated mode and an un-collimated mode.

* * * * *